US008502894B2

United States Patent
Chiang (10) Patent No.: US 8,502,894 B2
(45) Date of Patent: Aug. 6, 2013

(54) METHOD AND APPARATUS FOR RINGING AND HALO CONTROL

(75) Inventor: Patricia Wei Yin Chiang, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 754 days.

(21) Appl. No.: 12/649,746

(22) Filed: Dec. 30, 2009

(65) Prior Publication Data

US 2011/0157436 A1    Jun. 30, 2011

(51) Int. Cl.
*H04N 5/208* (2006.01)
*G06K 9/40* (2006.01)

(52) U.S. Cl.
USPC .......................................... 348/252; 382/266

(58) Field of Classification Search
USPC .................. 348/242, 252, 581, 625; 382/254, 382/222, 255, 263, 266–269; 358/447, 463, 358/3.27, 532
See application file for complete search history.

(56) References Cited

U.S. PATENT DOCUMENTS

| 7,620,261 | B2 | 11/2009 | Chiang et al. | |
|---|---|---|---|---|
| 7,782,401 | B1* | 8/2010 | Chou | 348/581 |
| 2006/0192897 | A1* | 8/2006 | Morphet | 348/625 |
| 2007/0160278 | A1* | 7/2007 | Fairbanks et al. | 382/128 |
| 2008/0170158 | A1* | 7/2008 | Jung et al. | 348/581 |
| 2008/0298712 | A1 | 12/2008 | Kang | |

* cited by examiner

*Primary Examiner* — Tuan Ho
*Assistant Examiner* — Akshay Trehan
(74) *Attorney, Agent, or Firm* — Wolf, Greenfield & Sacks, P.C.

(57) ABSTRACT

A system is disclosed for reducing artifacts in images and video, such as ringing or halo artifacts. The system may include an edge detector and a gain controller. The edge detector may create an edge image used by the gain controller to create a gain image, and the gain image may be used to reduce artifacts in an image. The gain controller may, for a current pixel in the edge image, compute the maximum value of the edge image over a window containing the current pixel. The gain controller may also perform averaging to determine a maximum edge value and a current edge value, and may also use a ratio of the current edge value and the maximum edge value to determine a gain to be applied to a pixel of an image.

28 Claims, 7 Drawing Sheets

METHOD AND APPARATUS FOR RINGING AND HALO CONTROL

BACKGROUND OF THE INVENTION

1. Field of Invention The techniques described herein relate generally to reducing artifacts in digital images, and more particularly to reducing ringing and halo artifacts in digital images.

2. Discussion of the Related Art

Digital image and video processing may occur in many different types of devices, including set-top boxes for cable television, televisions, cameras, videocameras, DVD players, DVD recorders, and computers. Some of these devices may create and store digital images and video, for example, by taking a picture with a digital camera. Other devices may take stored digital images and video and present them to a person on a screen, such as a computer.

The processing of digital images and video may cause undesirable artifacts to appear in the images and video. For example, in some situations, the encoding of digital images or video may cause ringing artifacts. In other situations, the resealing of digital images or video may also cause ringing artifacts. Ringing artifacts are artifacts that may appear near edges of an image and appear as concentric rings or adjacent lines emanating away from an edge.

In certain applications, digital images and video may be processed to enhance their appearance. One example is processing digital images or video by a process called "peaking" to enhance the appearance of images and video by making the edges clearer. The processing of images and video, for example by peaking, may also create undesirable artifacts. One undesirable artifact is the amplification of ringing artifacts. Another undesirable artifact is the appearance of excessive overshoot and undershoot adjacent to edges in an image, which may create a "halo" effect.

Artifacts in images and video, such as ringing artifacts and a halo effect, may be undesirable, and the appearance of images and video may be improved by controlling these artifacts.

BRIEF DESCRIPTION OF DRAWINGS

In the drawings, each identical or nearly identical component that is illustrated in various figures is represented by a like reference character. For purposes of clarity, not every component may be labeled in every drawing. In the drawings.

DETAILED DESCRIPTION

The techniques described herein relate to improving the appearance of digital images and video by reducing or removing artifacts such as ringing and halo effects during the enhancement of the images and video. In some embodiments of the techniques described herein, an edge detector, a gain controller, and an image processor may be used to process digital images and video for enhancement while reducing artifacts. An edge detector may detect the magnitude of edges throughout an image. For example, in a smooth region of an image without noticeable edges, the edge detector may output small values, but in regions of the image with sharp, noticeable edges, the edge detector may output large values. A gain controller may use the output of the edge detector to determine a gain to be applied for each pixel of an image to reduce or remove the appearance of artifacts. For example, some artifacts are more likely to appear adjacent to an edge in an image, and the gain controller may set the gain for pixels adjacent to an edge to reduce or remove those artifacts. An image processor may use the gain image and other information to improve the appearance of an image while reducing or removing artifacts.

Figure 1:
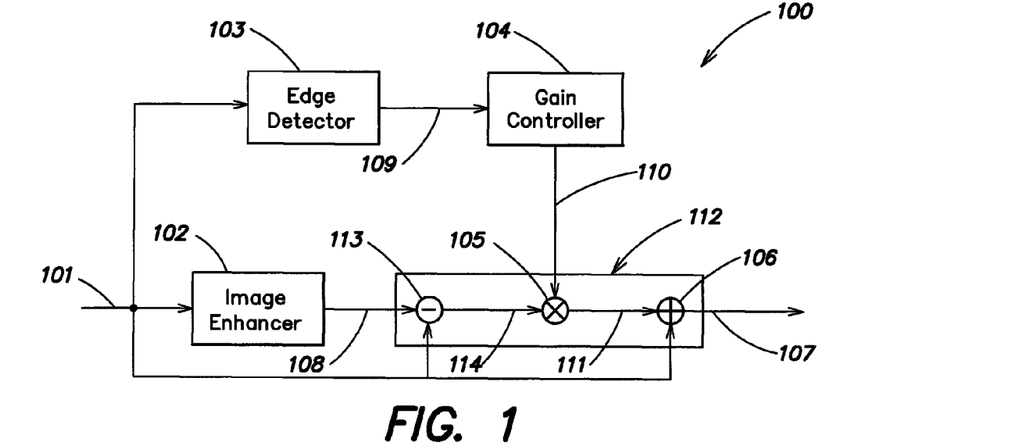
FIG. 1 shows an exemplary implementation of a system that may be used to reduce artifacts in images.

FIG. 1 shows one embodiment of system 100 that may be used to remove artifacts from images and video such as ringing and halo effects. System 100 has an input 101. Where system 100 is used to process an image, input 101 may be an entire image or some portion of an image. Where system 100 is used to process video, input 101 may be one or more frames of video or some portion of one or more frames. In the following description, input 101 will be referred to as original image 101, but the following description applies equally to digital video, and the same or similar processing may be used to process video instead of images.

In some embodiments of system 100, original image 101 may be processed by image enhancer 102 to create enhanced image 108. Enhanced image 108 is a processed version of original image 101 that may be enhanced in various ways. For example, image enhancer 102 may create enhanced image 108 that has improved sharpness over original image 101. Enhanced image 108 may contain artifacts not present in original image 101 or may contain amplified artifacts that are already present in original image 101. For example, enhanced image 108 may contain ringing that was caused or amplified by image enhancer 102 or may contain a halo effect that was caused or amplified by image enhancer 102. Enhanced image 108 may contain other types of artifacts, and the techniques described herein are not limited to any particular types of artifacts in enhanced image 108.

Image enhancer 102 may apply any image processing techniques such as those known to one of skill in the art. For example, image enhancer 102 could apply peaking to original image 101, but image enhancer 102 is not limited to any particular techniques and any suitable techniques may be applied.

The output of system 100 is reduced-artifact image 107. System 100 may enhance the appearance of original image 101 while reducing or removing artifacts. System 100 may create reduced-artifact image 107 by employing edge detector 103, gain controller 104, and image processor 112.

Original image 101 may be processed by edge detector 103 to compute edge image 109. An edge detector may compute values to indicate the presence of edges in an image and the steepness of the edges. In some embodiments, an edge detector may compute a value for each pixel in an image, where a high value indicates a steep edge near that pixel and a low value indicates that the image does not contain significant edges near that pixel. Any suitable edge detector may be used in system 100, such as those known to one of skill in the art or described herein.

One example of edge detector 103 that may be used with system 100 is now described. Edge detector 103 may compute edge image 109 by considering each pixel in original image 101 over a window containing the pixel. In some embodiments, this window may be a 3 by 3 pixel window. For example, if we denote the location of a current pixel of original image as (0, 0), the value of the current pixel as $P_{0,0}$, and the corresponding pixel of edge image 109 as E, then E may be computed as follows:

$$Grad_x = \left|\sum_{j=-1}^{1}\sum_{i=-1}^{1} G_{x1,i,j} \times P_{i,j}\right| + \left|\sum_{j=-1}^{1}\sum_{i=-1}^{1} G_{x2,i,j} \times P_{i,j}\right|$$

$$Grad_y = \left|\sum_{j=-1}^{1}\sum_{i=-1}^{1} G_{y1,i,j} \times P_{i,j}\right| + \left|\sum_{j=-1}^{1}\sum_{i=-1}^{1} G_{y2,i,j} \times P_{i,j}\right|$$

$$E = (Grad_x + Grad_y)/2$$

Figure 2:
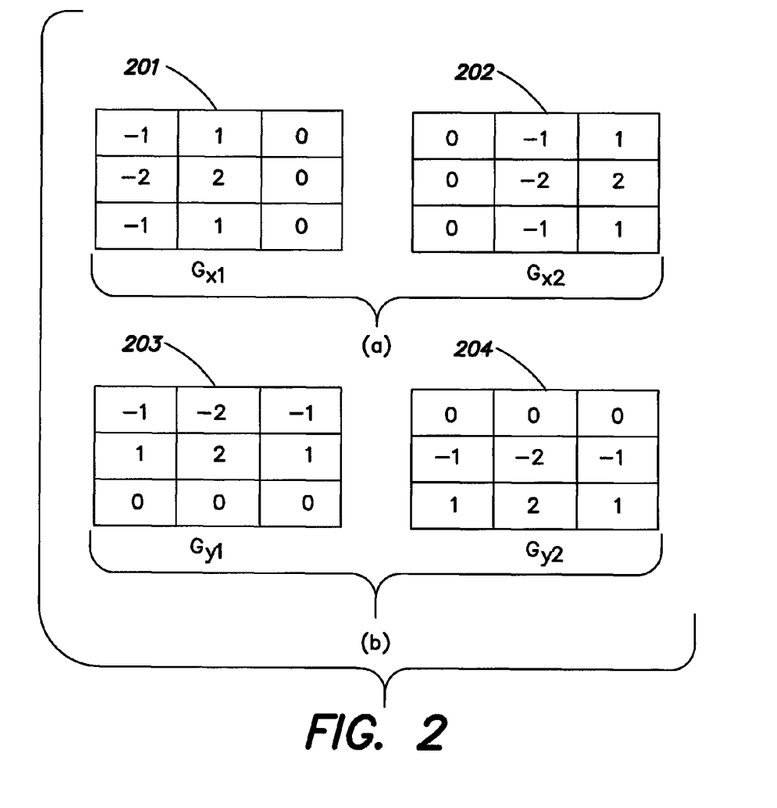
FIG. 2 shows example matrices that may be used by an edge detector in accordance with some embodiments.

One examples of matrices $G_{x1}$ 201, $G_{x2}$ 202, $G_{y1}$ 203, and $G_{y2}$ 204 that may be used to compute edge image 109 is shown in FIG. 2.

In some embodiments, edge image 109 may be the same size as original image 101, while in other embodiments edge image 109 may have a different size than original image 101. In other embodiments, edge detector 103 may be a one-dimensional edge detector instead of a two-dimensional edge detector. By detecting edges in one direction instead of two, system 100 may be computationally more efficient or may have decreased hardware costs.

Edge image 109 may then be processed by gain controller 104. Gain controller 104 may create a gain image 110 that may be used to modify enhanced image 108 by adjusting pixel values to reduce the appearance of artifacts. For example, some artifacts may be more likely to appear adjacent to steep edges in images, and gain controller may select gain values to appropriately adjust the values of pixels near steep edges to reduce or eliminate those artifacts.

In some embodiments, gain controller 104 may create information that may be used to selectively modify pixels in enhanced image 108 where artifacts are more likely to be present. In some embodiments, gain controller 104 may create information that may be used to modify many pixels in enhanced image 108 where the degree of modification for each pixel may be related to the likelihood of artifacts being present in a given location. In some embodiments, gain controller 104 may output a value of 1 for a pixel where that pixel should not change, output a value greater than 1 where the magnitude of the pixel value should increase, and output a value less than 1 where the magnitude of the pixel value should decrease. In some embodiments, gain controller 104 may output a value of 1 for a pixel where that pixel should not change and output a value less than 1 where the magnitude of the pixel value should decrease.

Gain controller 104 may take edge image 109 as input and compute gain image 110 as output. Any suitable technique may be used by gain controller 104 to compute gain image 110, and the techniques described herein are not limited to any particular method for computing gain image 110.

Figure 3:
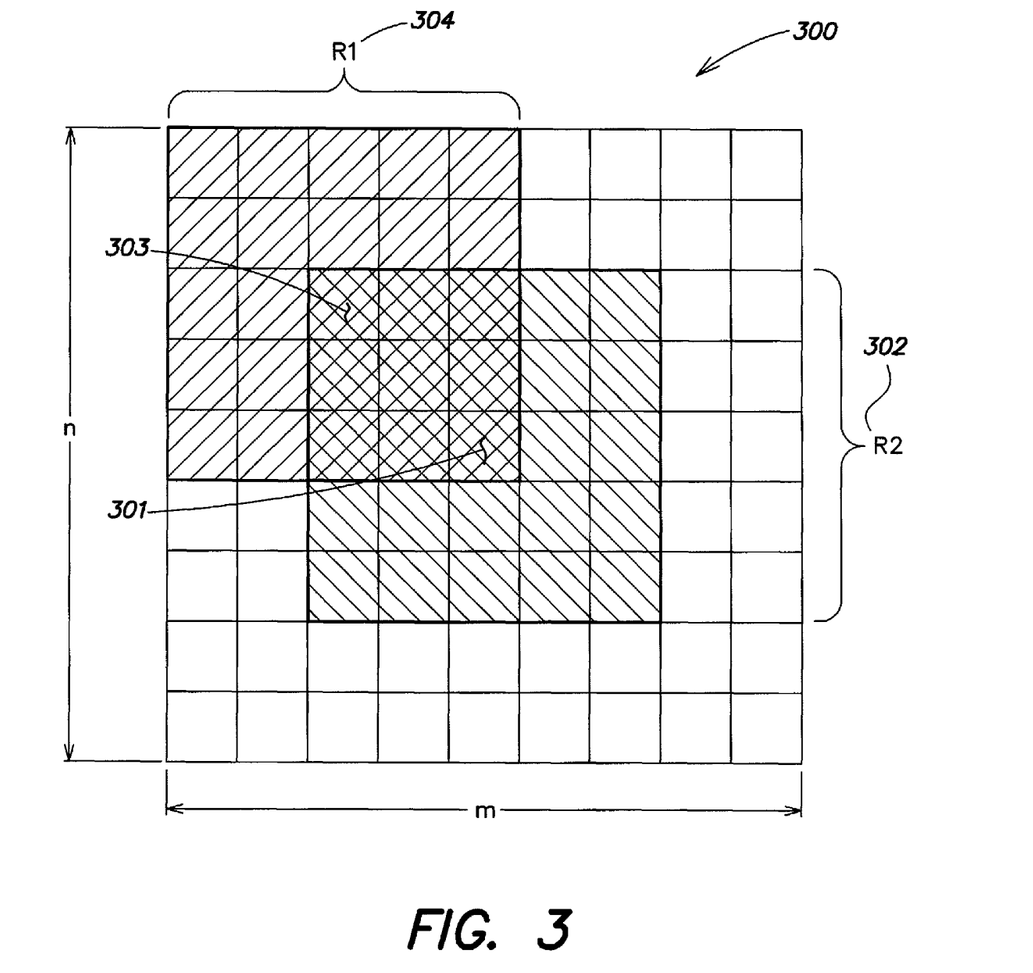
FIG. 3 shows an example of a window that may be used by a gain controller in accordance with some embodiments.

In one embodiment, gain controller 104 may compute gain image 110 by performing a computation for each pixel in edge image 109 that takes into account several pixel values over a window containing the pixel. FIG. 3 shows one example of a window with n rows and m columns that may be used by gain controller 104 for each pixel of edge image 109. The size of window 300 may be determined by considering the spatial extent of the artifacts in enhanced image 108. For example, the size of window 300 may be selected to cover the spatial extent of the artifacts. In some applications, a 9 by 9 window may by used while in other applications a 17 by 17 window may be preferable, but any suitable window size can be used. Window 300 may be applied to each pixel in edge image 109 to compute a corresponding pixel in gain image 110.

In FIG. 3, the pixel in edge image 109 for which the corresponding pixel in the gain image 110 is to be computed is denoted as "current pixel" 301. Current pixel 301 may be but need not be in the center of window 300. In FIG. 3, window 300 has 9 rows and 9 columns but window 300 need not be square and can have differing numbers of rows and columns.

In some embodiments, gain processor 104 may determine the pixel from edge image 109 within window 300 that has the largest value, which is denoted "maximum edge" 303 and has coordinates $m_x$, $m_y$. The coordinates of maximum edge 303 may be computed as follows:

$$\{m_x, m_y\} = \max\{\text{edge}_{i,j}\}_{-m/2,-n/2}^{m/2,n/2}$$

In some embodiments, after identifying maximum edge 303, gain processor 104 may perform averaging to reduce noise and improve the performance of system 100. By performing averaging, the value of the edge at current edge 301 may be averaged with the edge values of adjacent pixels, and the value of the edge at maximum edge 303 may also be averaged with the edge values of adjacent pixels. Any suitable method for averaging may be used, and the techniques described herein are not limited to any particular method of averaging.

In some embodiments, gain processor 104 may perform a type of averaging called shape adaptive averaging. Shape adaptive averaging may perform a series of calculations with respect to pixels within a window around the current edge 301, denoted as R2 302, and a window of pixels around maximum edge 303, denoted as R1 304. FIG. 3 shows examples, where R1 304 and R2 302 are each 5 by 5 windows, but these windows need not be square and may have other sizes.

In some embodiments, gain processor 104 may perform shape adaptive averaging using the following formulas:

$$\text{edge}_{cur} = \sum_{j=-n}^{n}\sum_{i=-n}^{n} \text{edge}_{i,j} \times \delta_{i,j}$$

$$\text{edge}_{max} = \sum_{j=m_y-n}^{m_y+n}\sum_{i=m_x-n}^{m_x+n} \text{edge}_{i,j} \times \sigma_{i,j}$$

$$\delta_{i,j} = \begin{cases} 1 & \text{edge}_{i,j} \leq \min(k_3\text{edge}_{0,0}, \max(k_1\text{edge}_{0,0}, k_2\text{edge}_{m_x,m_y})) \\ 0 & \text{otherwise} \end{cases}$$

$$\sigma_{i,j} = \begin{cases} 1 & \text{edge}_{i,j} \geq k_2\text{edge}_{m_x,m_y} \\ 0 & \text{otherwise} \end{cases}$$

In the above formulas, $\text{edge}_{cur}$ represents an average of the edge values in the window R2 302, which contains current edge 301. In performing this averaging, the function $\delta_{i,j}$ selects which pixels in window R2 302 will be considered in computing $\text{edge}_{cur}$. The function $\delta_{i,j}$ may include pixels whose edge values are close to the edge value of current edge 301 and may exclude pixels whose edge values are far from the edge value of current edge 301. In some embodiments, parameters $k_1$, $k_2$, and $k_3$ may be set to $k_1=1.25$, $k_2=0.5$, and $k_3=2.0$ and function $\delta_{i,j}$ may select pixels whose edge values are in the range specified by the formula above.

Similarly, $\text{edge}_{max}$ represents an average of the edge values in the window R1 304, which contains maximum edge 303. In performing this averaging, the function $\sigma_{i,j}$ selects which pixels in window R1 304 will be considered in computing $\text{edge}_{max}$. The function $\sigma_{i,j}$ may include pixels whose edge values are close to the edge value of maximum edge 303 and may exclude pixels whose edge values are far from the edge value of maximum edge 303. In some embodiments, parameter $k_2$ may be set to $k_2=0.5$, and function $\sigma_{i,j}$ may select pixels whose edge values are in the range specified by the formula above.

Gain processor 104 may then use $\text{edge}_{cur}$ and $\text{edge}_{max}$ to compute a pixel of gain image 110 denoted as G. In some embodiments, gain processor may compute the pixel G using the following formulas:

$$A = k_0 \times \text{edge}_{cur} / \text{edge}_{max} + c$$
$$B = \max(A, 0)$$
$$C = \min(B, 1)$$
$$f(\text{edge}_{max}) = \begin{cases} 1 & \text{edge}_{max} > T_e \\ 1 - k \times (T_e - \text{edge}_{max}) & \text{edge}_{max} \le T_e \end{cases}$$
$$G = 1 + f(\text{edge}_{max}) \times (C - 1)$$

The value A, shown above, may compute an initial gain value for the current pixel. As indicated above, some types of artifacts, such as ringing artifacts, may be more likely to appear adjacent to steep edges in the image. The initial gain value may be computed as a ratio of $\text{edge}_{cur}$ of window R2 302 and $\text{edge}_{max}$ of window R1 304 to detect situations where the current pixel may be close to a steep edge. For example, where the current pixel is in a flat area of the image near the bottom of a steep edge, the value $\text{edge}_{cur}$ may be relatively low and the value $\text{edge}_{max}$ may be relatively high, thus setting the initial gain A to a relatively low value to suppress artifacts. The parameters $k_0$ and $c$ may be adjusted to specify the level of gain control to be applied to an image. In some embodiments, parameters $k_0$ and $c$ may take on any of the following sets of values: (0, 255), (0, 128), (2, 64), (0, 64), (2, 0), (0, 0), (2, −64), or (4, −128).

In some embodiments, it may be preferable to have the gain value be a number in the range of 0 and 1. The computations to compute the value C may clip the value A to a maximum of 1 and a minimum of 0.

In computing G, the gain value may be adjusted to improve the performance of system 100. Some artifacts are more likely to occur near edges in an image, and the prominence of these artifacts may be greater for steeper edges. For a pixel near a steep edge, stronger gain control may be preferable while for a pixel near a shallow edge, less gain control may be preferable. In computing G, the gain is adjusted based on the steepness of maximum edge 303, which is reflected in edge. Where $\text{edge}_{max}$. Where $\text{edge}_{max}$ is greater than a threshold $T_e$, then the value of function $f$ is one and G is the same as C. Where $\text{edge}_{max}$ is less than a threshold $T_e$, then the function $f$ is less than one, and the gain value is adjusted so that less gain control is applied. In some embodiments, the parameters $T_e$ and k may take values $T_e=64$ and $k=1/64$.

For any of the parameters referred to above, the parameters may be tuned to improve performance of system 100. For example, parameters can be separately tuned according to the local contrast. With some images, visual masking may render ringing artifacts more obvious in a region with high contrast as compared to a region with low contrast.

In some embodiments, gain image 110 may be the same size as edge image 109, while in other embodiments gain image 110 may have a different size than edge image 109. In other embodiments, gain controller 104 may operate in one dimension instead of in two dimensions. By having gain controller 104 operate in one dimension rather than in two, system 100 may be computationally more efficient or may have decreased hardware costs.

System 100 may use image processor 112 to create reduced-artifact image 107 using gain image 110 and enhanced image 108. Image processor 112 may use any suitable techniques known by one of ordinary skill in the art to create reduced-artifact image 107 using gain image 110. In some embodiments, image processor 112 may include subtractor 113, multiplier 105, and adder 106.

Subtractor 113 may subtract the original image 101 from the enhanced image 108 to generate difference image 114. Multiplier 105 may multiply the pixel values in gain image 110 and the pixel values in difference image 114 to produce gain-controlled image 111. Before multiplying gain image 110 and difference image 114, either image may be transformed in ways known to a person of ordinary skill in the art. For example, the pixel values in gain image 110 may be scaled or clipped to increase or decrease the impact that gain image 110 may have on difference image 114.

Adder 106 may add the pixel values in gain-controlled image 111 and the pixel values in original image 101 to produce reduced-artifact image 107. Before adding gain-controlled image 111 and original image 101, either image may be transformed in ways known to a person of skill in the art. For example, a weight may be applied to either or both of gain-controlled image 111 and original image 101 to adjust their relative contributions to reduced-artifact image 107.

Figure 4:
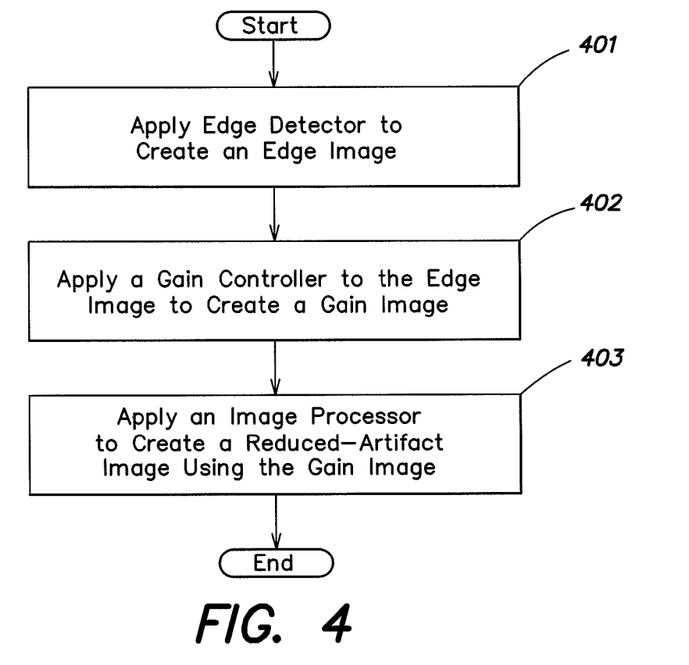
FIG. 4 is a flow chart of an illustrative process for reducing artifacts in an image in accordance with some embodiments.

FIG. 4 shows an example of a process that may be used to reduce artifacts in an image in accordance with the techniques described above. The process of FIG. 4 begins at act 401, wherein an edge detector is applied to detect edges in an image and create an edge image. This edge detector may be implemented in software or hardware and may operate in any number of dimensions.

The process continues to act 402 where a gain controller is applied to the edge image to create a gain image. The gain controller may be implemented in hardware or software, and exemplary implementations of a gain controller are described above.

The process continues to act 403 where an image processor is applied to gain image to create a reduced-artifact image. This image processor may be implemented in software or hardware, and exemplary implementations of image processor are described above.

Figure 5:
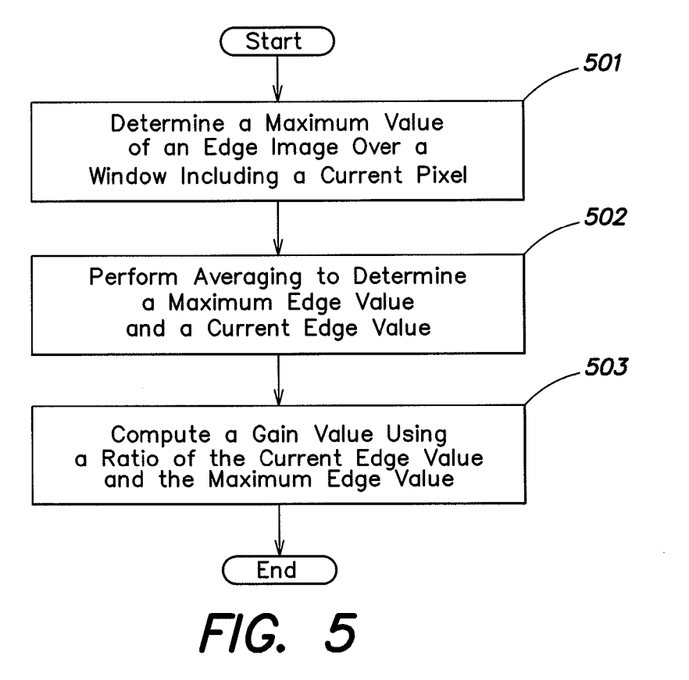
FIG. 5 is a flow chart of an illustrative process for a gain controller to compute a gain value in accordance with some embodiments.

FIG. 5 shows an example of a process that may be used by a gain controller to create a gain image using an edge image in accordance with the techniques described above. The process of FIG. 5 begins at act 501 where, for a current pixel of the edge image, a maximum value of the edge image over a window comprising the current pixel is determined. This act may be implemented in software or hardware, and exemplary implementations of this act are described above.

The process continues to act 502 where the gain controller performs averaging of a maximum edge value and a current edge value. This act may be implemented in software or hardware, and exemplary implementations of this act are described above.

The process continues to act 503 where the gain controller computes a gain value using a ratio of current edge value and the maximum edge value. This act may be implemented in software or hardware, and exemplary implementations of this act are described above.

Figure 6:
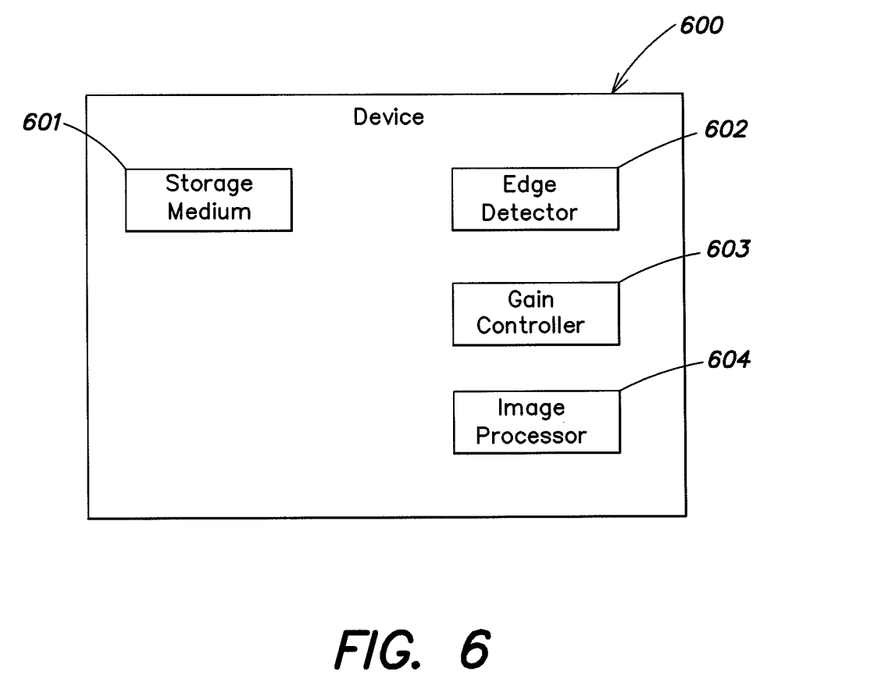
FIG. 6 is an example of a device that may be used to reduce artifacts in images in accordance with some embodiments.

FIG. 6 shows an example of a device 600 that may be used to reduce artifacts in images in accordance with the techniques described above. Device 600 may be any device that records or displays images or video. For example, device 600 may be a set-top box for cable television, a television, a camera, a video camera, a DVD player, a DVD recorder, or a computer. Device 600 may also comprise any components typically found in a set-top box for cable television, a television, a camera, a video camera, a DVD player, a DVD recorder, or a computer. For example, device 600 may comprise one or more processors, such as general purpose processors and specialized processors; one or more input and output devices, such as display screens, keyboards, and pointing devices; one or more components to connect to one or more wired or wireless networks; and one or more storage mediums, such as random access memory, read only memory, hard disk drives, optical discs, and flash memory.

Device 600 may comprise a storage medium 601. The storage medium may be a memory or any other type of storage medium and may store a plurality of instructions that, when executed on one or more processors, implement any of the techniques described herein. Storage medium 601 may also store one or more images and/or video.

Device 600 may also comprise an edge detector 602 that may be applied to detect edges in an image and create an edge image. Edge detector 602 may be implemented in software or hardware and may operate in any number of dimensions.

Device 600 may also comprise a gain controller 603 that may be applied to an edge image to create a gain image. Gain controller 603 may be implemented in software or hardware and may operate in any number of dimensions.

Device 600 may also comprise an image processor 604 to create a reduced-artifact image using a gain image. Image processor 604 may be implemented in software or hardware. Where implemented in hardware, image processor may comprise one or more general or specialized processors. For example, image processor may comprise one or more digital signal processors or graphics processing units.

Figure 7A:
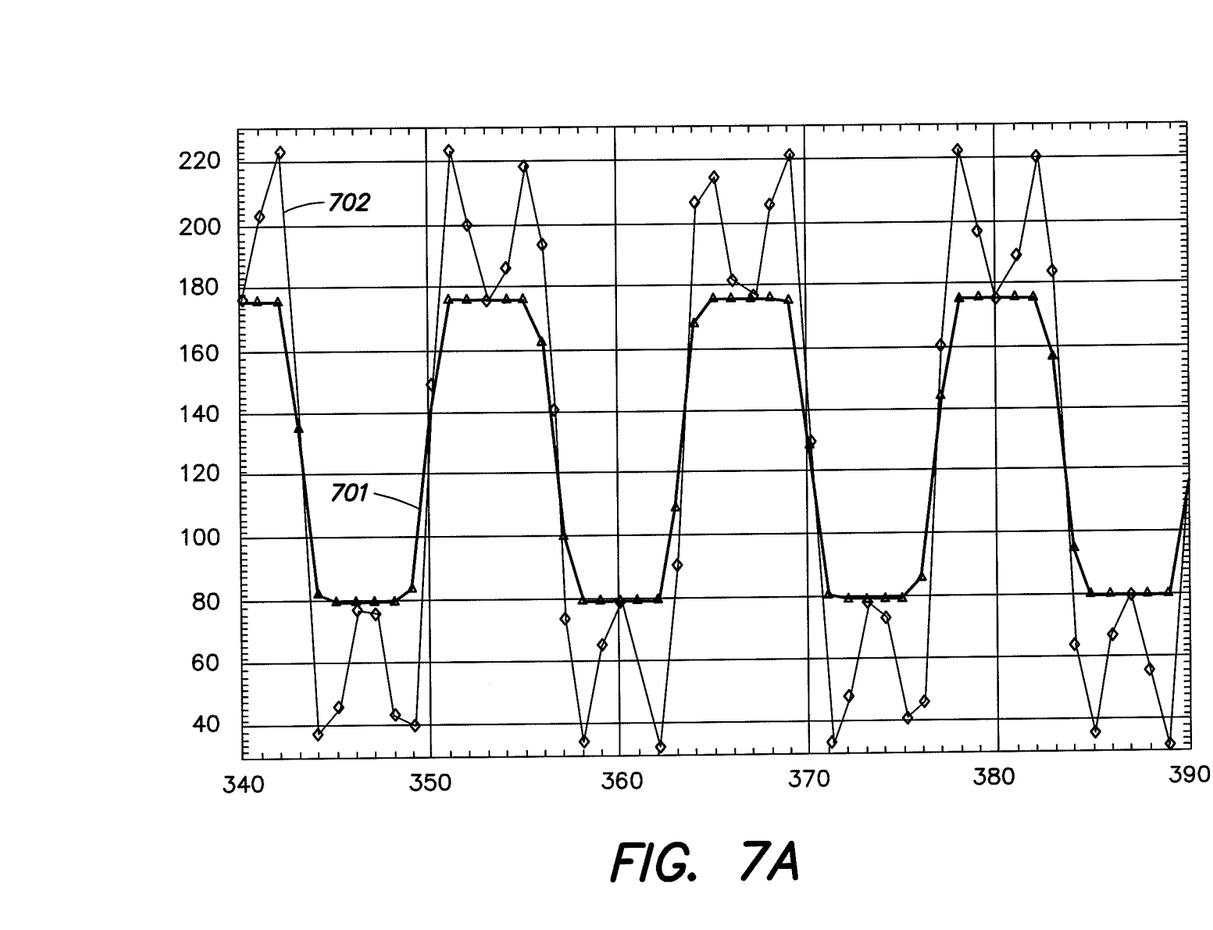
FIG. 7 shows cross sections of example images to illustrate artifacts in images and the appearance of images after artifacts have been reduced.
Figure 7B:
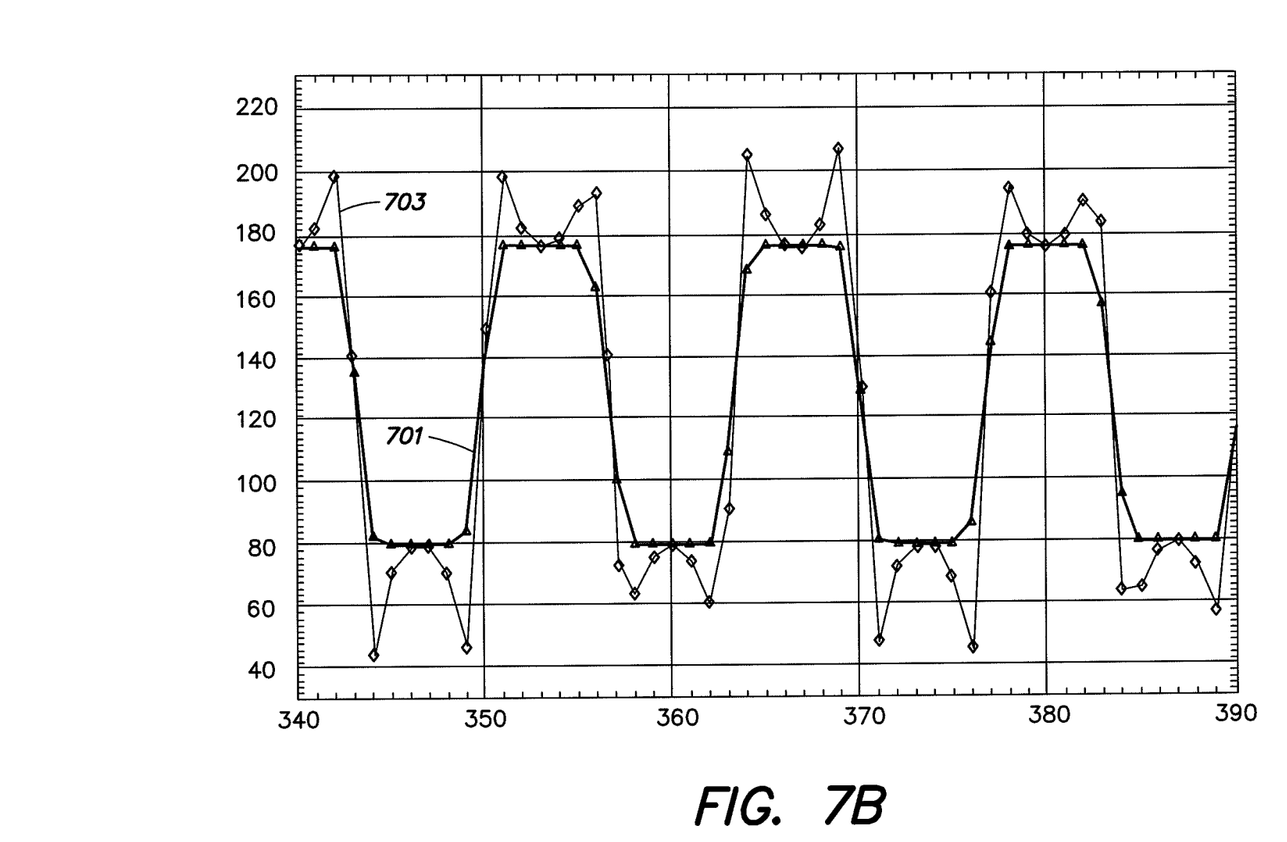
Figure 7C:
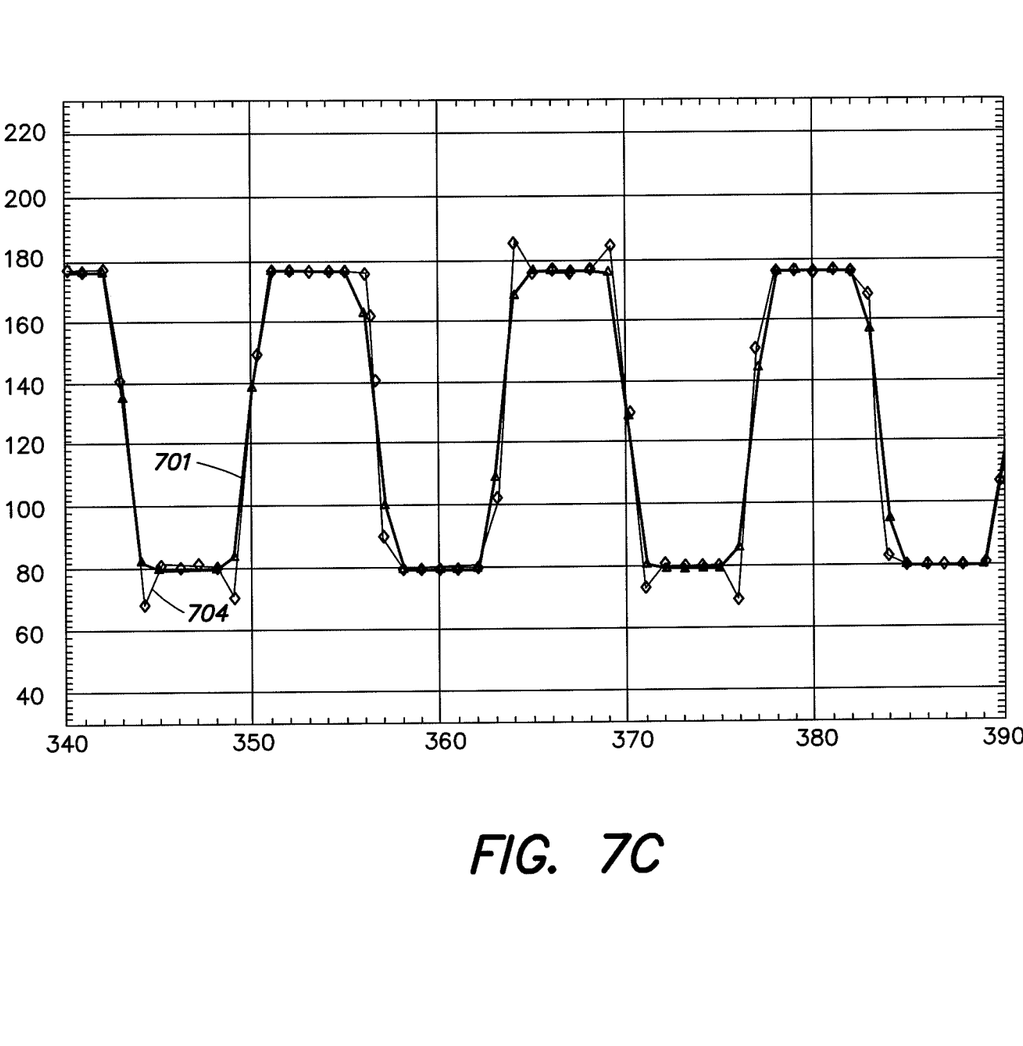

FIG. 7 shows cross sections of example images to illustrate artifacts in images and the appearance of images after artifacts have been reduced. In FIGS. 7A, 7B, and 7C, a cross section of the example image 701 is shown. Artifacts may be added to the example image for any of the reasons discussed above, and FIG. 7A also shows an illustrative cross section of the example image with ringing noise 702. Using the techniques disclosed above, the ringing artifacts may be reduced, and FIGS. 7B and 7C show illustrative cross sections of how images may appear after ringing artifacts have been reduced. The parameters discussed above may be set to achieve mid-level ringing control, and FIG. 7B shows an illustrative cross section 702 showing how ringing artifacts may appear after mid-level ringing control has been applied. The parameters discussed above may also be set to achieve strong ringing control, and FIG. 7C shows an illustrative cross section 703 showing how ringing artifacts may appear after strong ringing control has been applied.

Having thus described some illustrative embodiments of the invention, it should be apparent to those skilled in the art that the foregoing is merely illustrative and not limiting, having been presented by way of example only. Numerous modifications and other embodiments may be used that fall within the scope of the invention.

Use of ordinal terms such as "first," "second," "third," etc. in the claims to modify a claim element or item in the specification does not by itself connote any priority, presence or order of one element over another. In addition, the use of an ordinal term does not by itself connote a maximum number of elements having a certain name that can be present in a claimed device or method. Any suitable number of additional elements may be used unless a claim requires otherwise. Ordinal terms are used in the claims merely as labels to distinguish one element having a certain name from another element having a same name. The use of terms such as "at least one" or "at least a first" in the claims to modify a claim element does not by itself connote that any other claim element lacking a similar modifier is limited to the presence of only a single element. Any suitable number of additional elements may be used unless a claim requires otherwise. The use of "including," "comprising," or "having," "containing," "involving," and variations thereof herein, is meant to encompass the items listed thereafter and equivalents thereof as well as additional items.

What is claimed is:

1. A method for reducing an artifact in an image, the method comprising:
   detecting edges in the image and creating an edge image;
   forming a gain image using the edge image; and
   forming a reduced-artifact image using the gain image,
   wherein the step of forming the gain image further comprises, for a first pixel of the edge image, steps comprising:
      determining a maximum value of the edge image over a window of the edge image comprising the first pixel and at least one other pixel;
      performing averaging to determine an average maximum edge value and an average first edge value; and
      computing a gain value using a ratio of the average first edge value and the average maximum edge value.

2. The method of claim 1, wherein the gain image is formed by calculating a gain to be applied to individual pixels in the image.

3. The method of claim 1, wherein the averaging is shape-adaptive averaging.

4. The method of claim 1, wherein the step of forming the reduced-artifact image further comprises multiplying pixels of the gain image with pixels of another image.

5. The method of claim 1, wherein the step of forming the reduced-artifact image further comprises adding pixels of the image to pixels of another image.

6. The method of claim 1, wherein the step of detecting edges in the image comprises detecting edges in two dimensions.

7. The method of claim 1, wherein the step of forming the reduced-artifact image operates in two dimensions.

8. The method of claim 1, wherein the method reduces a ringing or a halo artifact in the image.

9. The method of claim 1, wherein the image is a portion of another image, a frame of video, or a portion of a frame of video.

10. A device for reducing an artifact in an image comprising:
    an edge detector that creates an edge image using the image;
    a gain controller that creates a gain image using the edge image; and
    an image processor that creates a reduced-artifact image using the gain image,
    wherein the gain controller performs, for a first pixel of the edge image, steps comprising:

determining a maximum value of the edge image over a window of the edge image comprising the first pixel and at least one other pixel;

performing averaging to determine an average maximum edge value and an average first edge value; and computing a gain value using a ratio of the average first edge value and the average maximum edge value.

11. The device of claim 10, wherein the gain controller creates the gain image by calculating a gain to be applied to individual pixels in the image.

12. The device of claim 10, wherein the averaging is shape-adaptive averaging.

13. The device of claim 10, wherein the image processor that creates the reduced-artifact image multiplies pixels of the gain image with pixels of another image.

14. The device of claim 10, wherein the image processor that creates the reduced-artifact image adds pixels of the image to pixels of another image.

15. The device of claim 10, wherein the edge detector is a two-dimensional edge detector.

16. The device of claim 10, wherein the gain controller is a two-dimensional gain controller.

17. The device of claim 10, wherein the artifact is ringing or a halo effect.

18. The device of claim 10, wherein the image is a portion of another image, a frame of video, or a portion of a frame of video.

19. The device of claim 10, wherein the device is a set-top box for cable television, a television, a camera, a video camera, a DVD player, a DVD recorder, or a computer.

20. A non-transitory computer-readable storage medium encoded with instructions that, when executed by a processor, perform a method for reducing an artifact in an image, the method comprising:

detecting edges in the image and creating an edge image;
forming a gain image using the edge image; and
forming a reduced-artifact image using the gain image,
wherein the step of forming the gain image further comprises, for a first pixel of the edge image, steps comprising:

determining a maximum value of the edge image over a window of the edge image comprising the first pixel and at least one other pixel;

performing averaging to determine an average maximum edge value and an average first edge value; and computing a gain value using a ratio of the average first edge value and the average maximum edge value.

21. The computer-readable storage medium of claim 20, wherein the gain image is formed by calculating a gain to be applied to individual pixels in the image.

22. The computer-readable storage medium of claim 20, wherein the averaging is shape-adaptive averaging.

23. The computer-readable storage medium of claim 20, wherein the step of forming the reduced-artifact image further comprises multiplying pixels of the gain image with pixels of another image.

24. The computer-readable storage medium of claim 20, wherein the step of forming the reduced-artifact image comprises adding pixels of the image to pixels of another image.

25. The computer-readable storage medium of claim 20, wherein the step of detecting edges in the image comprises detecting edges in two dimensions.

26. The computer-readable storage medium of claim 20, wherein the step of forming the reduced-artifact image operates in two-dimensions.

27. The computer-readable storage medium of claim 20, wherein the method reduces a ringing or a halo artifact in the image.

28. The computer-readable storage medium of claim 20, wherein the image is a portion of another image, a frame of video, or a portion of a frame of video.

* * * * *

UNITED STATES PATENT AND TRADEMARK OFFICE
CERTIFICATE OF CORRECTION

PATENT NO. : 8,502,894 B2  
APPLICATION NO. : 12/649746  
DATED : August 6, 2013  
INVENTOR(S) : Patricia Wei Yin Chiang Page 1 of 1

It is certified that error appears in the above-identified patent and that said Letters Patent is hereby corrected as shown below:

In the Specification:

Col. 1, line 22, should read:
rescaling of digital images or video may also cause ringing Signed and Sealed this
Twenty-fourth Day of September, 2013

Teresa Stanek Rea
*Deputy Director of the United States Patent and Trademark Office*